Sept. 27, 1927.                       1,643,484
W. J. BECKFIELD
NUT LOCK
Filed March 31, 1927

Inventor
William J. Beckfield.

By Clarence A. O'Brien
Attorney

Patented Sept. 27, 1927.

1,643,484

UNITED STATES PATENT OFFICE.

WILLIAM JOHN BECKFIELD, OF PITTSBURGH, PENNSYLVANIA.

NUT LOCK.

Application filed March 31, 1927. Serial No. 179,935.

This invention relates to an improvement in nut locks, and more particularly to a construction wherein a nut is effectively locked on a bolt.

The invention comprehends the provision of a nut adapted for screw threaded connection with a bolt in the usual manner, having an annular recess formed in the outer face of the nut around the bolt receiving opening therein having a partial filler of lead or other soft metal which is adapted for ready application on a bolt in the usual manner, and a locking member having a cylindrical projection on one face having a diamond shaped head projecting from said cylindrical projection at one side of the bolt receiving opening therein, which is adapted to fit within the recess face of the nut, in order that the cylindrical projection will prevent the flow of lead or other soft metal outwardly beyond the face of the nut while the diamond shaped member will plow the soft material in such a manner as to force it into firm contact with the threads on the bolt and cooperate to prevent relative movement between the nut and its locking member.

The invention comprehends numerous other objects residing in the specific construction and relation of the parts which are more particularly pointed out in the following detailed description, and in the claims directed to a preferred form of the invention, it being understood however, that various changes in the size, shape and relation of the parts may be made without departing from the spirit and scope of the invention as herein set forth.

In the drawing forming part of this application:—

Figure 1:
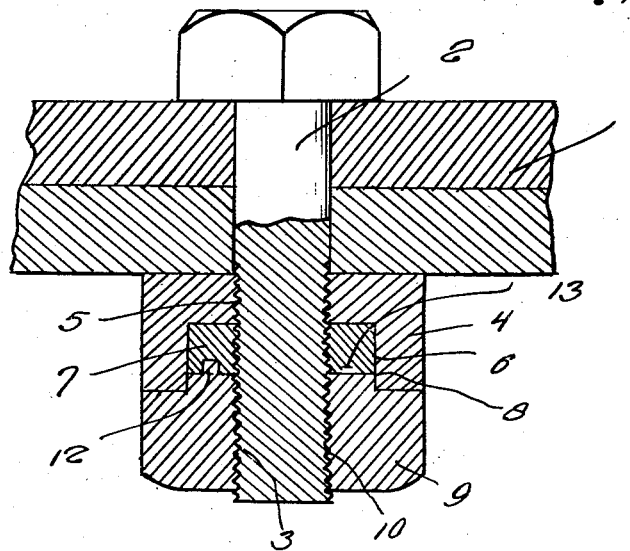
Figure 1 is a vertical sectional view thru the improved invention showing the parts in assembled and locked relation for securing a a nut in locked position on a bolt.

1 indicates a pair of plates or other structures to be secured together with the use of a bolt and nut, a bolt being indicated at 2 and having the threaded shank 3. The nut 4 forming part of the present invention is of the usual general construction, having a threaded bore 5 for threaded cooperation with the threads on the bolt.

In connection with this invention, the nut 4 is provided with an annular recess adjacent the threaded bore 5 as indicated at 6 which is provided with a suitable filler of soft metal 7 such as lead or the like, adapted to normally terminate below the end face of the nut as indicated by the numeral 8 in Fig. 1.

Figure 3:
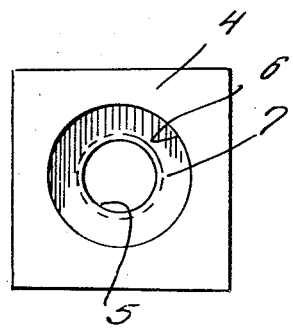
Fig. 3 is a view of the outer face of the nut showing the section thereof filled with the soft metal.

The central portion of this soft metal is threaded the same as the bore 5 of the nut in order that it may be readily applied to the threaded shank 3 of the bolt. The outer surface of the lead contained within the recess 6 normally has an unbroken surface as generally shown in Fig. 3, ready for its operation in locking the nut to the bolt.

This invention includes a locking member 9 which is similar in construction to a nut having a threaded bore 10 for threaded connection with the shank of the bolt, and which on one face has the cylindrical projection 11 through which the bore 10 extends, and which is of a size to fit within the annular recess 6 of the nut 4 as shown in Fig. 1.

Figure 2:
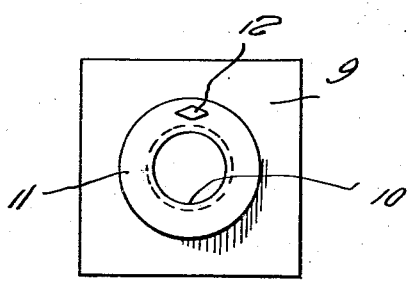
Fig. 2 is an end view showing the face of the locking member adapted for engagement with the nut.

This cylindrical projection is provided at 12 with a diamond-shaped head as shown in Fig. 2, adapted for engagement with the soft metal 7 carried by the nut 4 in providing the locking action between the member 9 the nut 4 and the bolt.

This locking of the nut 4 to the bolt is obtained by first tightening the nut on the bolt to the proper degree for securing the plates 1 or other material together. The locking member 9 is then threadedly mounted on the shank of the bolt and turned to the position shown in Fig. 1. In the application of this locking member, the cylindrical projection 11 will first move into the end of the recess 6 and immediately following the diamond head 12 will engage the surface of the soft metal 7, and upon being further turned down on the bolt, it will plow a furrow in the soft metal as indicated at 13 in Fig. 1 and cause the metal to be displaced into the threads of the bolt 2, through the compressive action occasioned by the diamond head cutting through the surface thereof.

In addition, the projection 11 will prevent the flow of the soft metal outwardly of the recess of the nut and when the face of the member 9 becomes engaged with the face of the nut 4, the end of projection 11 will have just previously engaged with the soft metal 7 in the recess 6 and served to further compress the same within the recess to exert its locking action between the bolt and the nut 4, as well as provide a substantial friction against the end of the projection 11 and around the head 12 to prevent detachment of the member 9 from the nut 4 without considerable force being required to turn the nut.

As a result of this invention, operating in the manner above described, it will be seen that an exceedingly simple construction has been provided for effectively locking a nut to a bolt and in which the soft metal will not become lost in the engagement of disengagement of the locking member 9 therefrom, and which upon subsequent application of the locking member to the nut, will operate in the same manner in each time, for compressing the soft metal into the threads of the bolt.

Having thus described my invention, what I claim as new is:—

A nut lock comprising a nut having a threaded bolt receiving opening, said nut being formed with an annular recess in one face around said openings, a soft metal filler partially filling said recess concentrically of said bolt receiving opening in the nut, and a locking member having a threaded bolt receiving opening in the central portion and an annular projection on one face around said bolt receiving opening, said projection having a head formed thereon, whereby application of the locking member to a bolt following application of the nut thereto will engage the projection on said member in the recess in said notch and force the soft metal through the compressive action of the projection into frictional engagement with the bolt, said soft metal cooperating with the head on said projection to lock the locking member against rotation relative to the bolt.

In testimony whereof I affix my signature.

WILLIAM JOHN BECKFIELD.